United States Patent [19]

Takizawa et al.

[11] Patent Number: 4,476,378
[45] Date of Patent: Oct. 9, 1984

[54] GLOW PLUG FOR USE IN DIESEL ENGINE

[75] Inventors: Tozo Takizawa; Koji Hatanaka, both of Higashimatsuyama, Japan

[73] Assignee: Jidosha Kiki Co., Ltd., Tokyo, Japan

[21] Appl. No.: 372,311

[22] Filed: Apr. 27, 1982

[30] Foreign Application Priority Data

Apr. 30, 1981 [JP] Japan ............................. 56-65994

[51] Int. Cl.³ ............................................. F23Q 7/22
[52] U.S. Cl. ............................. 219/270; 123/145 A;
219/523; 219/553; 361/266; 338/299; 338/22 R; 431/262
[58] Field of Search ............... 219/260, 267, 270, 523, 219/552, 553; 361/264, 265, 266; 123/145 R, 145 A; 431/208, 262, 263; 338/22 R, 218, 299, 302

[56] References Cited

U.S. PATENT DOCUMENTS

| 2,464,820 | 3/1949 | Livera | 338/299 |
| 2,492,755 | 12/1949 | McCollum | 219/267 |
| 2,575,113 | 11/1951 | Lennox | 361/266 |
| 2,844,692 | 7/1958 | Berkelhamer | 338/299 X |
| 3,158,787 | 11/1964 | Testerini | 123/145 A X |
| 3,689,195 | 9/1972 | Beesch et al. | 431/208 |
| 4,112,577 | 9/1978 | Mann | 361/266 X |
| 4,211,204 | 7/1980 | Glauner et al. | 123/145 A |
| 4,292,934 | 10/1981 | Knowles | 123/145 A |

FOREIGN PATENT DOCUMENTS

| 2802625 | 7/1979 | Fed. Rep. of Germany . |
| 254482 | 7/1926 | United Kingdom | 123/145 A |
| 859659 | 1/1961 | United Kingdom | 123/145 A |
| 1127454 | 9/1968 | United Kingdom . |
| 1215013 | 12/1970 | United Kingdom | 219/270 |
| 2013277A | 8/1979 | United Kingdom . |

Primary Examiner—Volodymyr Y. Mayewsky
Attorney, Agent, or Firm—Charles E. Pfund

[57] ABSTRACT

A glow plug for use in a diesel engine comprises first and second helical heaters covered with a sheath. The second heater is made of material having larger resistance temperature coefficient than that of the first heater. A gap larger than winding pitches of the two heaters is provided there between and the two heaters are electrically interconnected in the gap.

7 Claims, 11 Drawing Figures

GLOW PLUG FOR USE IN DIESEL ENGINE

BACKGROUND OF THE INVENTION

This invention relates to a glow plug utilized to preheat the sub- or auxiliary combustion chamber or the main combustion chamber of a diesel engine.

The starting characteristic of a diesel engine is generally poor at low temperature so that it is the common practice to increase the suction temperature by installing a glow plug in the sub-combustion chamber or main combustion chamber and by passing electric current through the glow plug. The glow plug is also used as a source of ignition for improving the starting characteristic of the diesel engine. As the glow plug, so-called sheathed type glow plug has been used in which a helical heating wire made of iron, chromium or nickel or alloys thereof is packed in a heat resistant electric insulating powder contained in a sheath made of heat resistant metal with the helical heating wire connected at one end to the tip of the sheath. The sheathed type glow plug can be used over a long time in high temperature gas in the sub- or main combustion chamber.

With the sheathed type glow plug described above, since the sheath is heated indirectly by the heating wire it takes a long time to increase the temperature of the glow plug to the operating temperature. More particularly, the heat generated by passing electric current through the heating wire is transmitted to the sheath through the heat resistant electric insulating powder, it takes a long time before the sheath becomes red hot. Moreover, the efficiency of heat transmission is low. Thus for example, it takes several tens seconds until the temperature of the plug is increased to 800° C., for example, thus failing to rapidly start the diesel engine.

The temperature rise time can be decreased by passing a large current at the initial stage of energization so as to cause the heating wire to quickly generate heat, but such measure is liable to melt the heating wire or to damage the sheath by high temperature. This also affects the battery and electric circuit and in an extreme case melts a fuse. To prevent these problems, it is necessary to provide a temperature control device for the heating wire which increases the cost of the preheating device.

In recent years, diesel engines are abundantly used for general purpose motor cars, and in order to make the diesel engines to be comparable with gasoline engines it is desired to develope a quick heating type glow plug for improving the starting characteristic.

To meet such requirement, various improvements have been made including the selection of the material for the heating wire, and to improve the temperature rise characteristic by supplying a large current glow plug have been developed in which heating wires made of two types of materials having different resistance temperature coefficients are used as disclosed in British Pat. No. 1,376,817 and Japanese Laid Open patent specification No. 109,538 of 1979.

Although the glow plug utilizing heating wires made of two types of materials can quickly raise the temperature, its cost of manufacturing is high and the heat generating characteristic is not yet satisfactory.

As a result of exhaustive investigation, we have found that in the previously developed construction, the heating wires of two types are too closely disposed so that the interval of passing large current at the initial stage is shortened due to the effect of heat.

More particularly, in the prior art glow plug of this type, a heater having a lower resistant temperature coefficient is disposed on the front side, while a heater having a higher resistant temperature coefficient is disposed on the rear side and wherein the resistance variation caused by the temperature variation of the rear side heater is used to supply large current to the front side heater immediately after starting energization so as to rapidly red heat the front side heater. However, since both heaters are closely disposed the temperature of the rear side heater is too quickly raised due to the effect of heat from the front side heater whereby the resistance of the rear side heater increases to limit the current supplied to the front side heater. For this reason, the prior art glow plug of this type has poor heating characteristics and can not manifest rapid heating characteristic.

SUMMARY OF THE INVENTION

Accordingly, it is an object of this invention to provide an improved glow plug for use in a diesel engine utilizing two types of helical heaters capable of improving the temperature rise characteristic.

Another object of this invention is to provide an improved glow plug to use in a diesel engine of the type using first and second serially connected electric heaters wherein temperature of the first heater and hence the heating characteristic of the glow plug can be controlled by the second heater thereby eliminating independent current control device which has been necessary in the prior art glow plug.

Still another object of this invention is to provide an improved glow plug for use in a diesel engine, which has a simple construction, easy to fabricate, and a high reliability.

According to this invention, there is provided a glow plug for use in a diesel engine comprising a first helical heater, a second helical heater serially connected to the first helical heater, the second helical heater being made of material having larger positive resistance temperature coefficient than material constituting the first helical heater, and sheath covering the first and second heaters, both heaters being separated by a gap larger than winding pitches of the first and second heaters and connected in the gap.

DESCRIPTION OF THE PREFERRED EMBODIMENT

Figure 1:
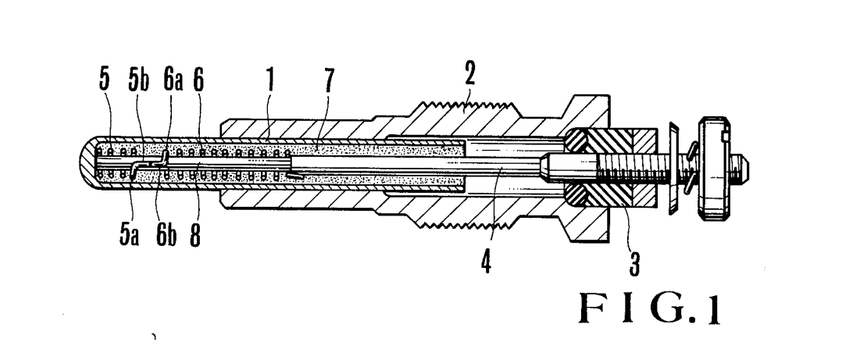
FIG. 1 is a longitudinal sectional view showing the construction of one embodiment of a glow plug according to this invention and utilized in a diesel engine.
Figure 2:
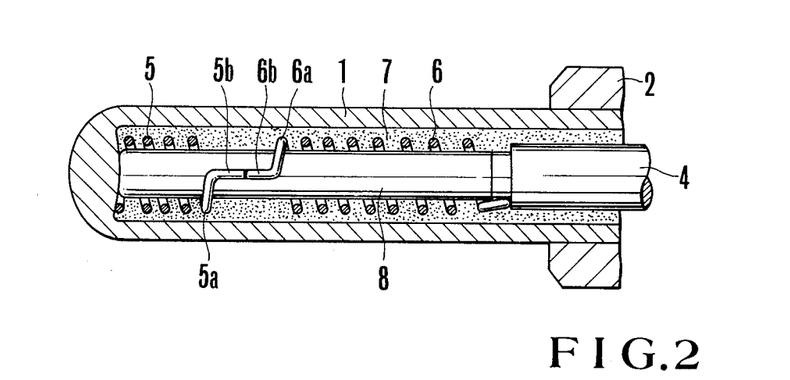
FIG. 2 is an enlarged longitudinal sectional view of the front portion of the glow plug shown in FIG. 1.

A glow plug embodying the invention and shown in FIGS. 1 and 2 comprises a sheath 1 made of such heat resistant metal as stainless steel or the like, a housing 2 which holds the sheath 1 at its tip, and an electrode rod 4 concentrically secured to the rear end of the housing 2 via an insulating bushing 3, the tip of the electrode rod 4 extending into the sheath 1.

A first helical heater 5 made of a electroconductive material having a small resistance temperature coefficient, for example an ferro-chromium alloy or a nickel-chromium alloy is disposed to extend in the axial direction in a space within the front end of the sheath 1 and one end of the first heater 5 which is electrically connected to the tip of the sheath 1.

In a space within the rear side of the sheath 1 and between the rear end of the first heater 5 and the electrode rod 4 at the rear end of the sheath 1 is disposed a second helical heater 6 made of electric conductive material having a large resistance temperature coefficient made of nickel or low carbon steel containing less than 0.25% by weight of carbon, the first and second heaters extending coaxially. These first and second heaters 5 and 6 are embedded in a heat resistant electric insulating powder such as magnesia.

The second heater 6 acts not only as a heat source but also as a temperature control means which supplies a large power immediately after passing the current but decreases the power with time thus limiting the saturation temperature of the glow plug and hence preventing over-heating of the glow plug. Thus, the second heater 6 is made of material having larger resistance temperature coefficient than that comprising the first heater 5 so that immediately after passing the current the quantity of heat generated by the second heater 6 is extremely small and hence its resistance is also low. As the time of current flow elapses the temperature of the second heater 6 increases gradually due to the heat generated by itself and the heat conducted from the first heater 5 and the resistance of the second heater 6 increases in proportion to its temperature rise thus limiting the power supplied to the first heaters.

It is advantageous to use low carbon steel having sufficiently larger resistance temperature coefficient than nickel to prepare the second heater 6. Then it is possible not only to limit the power supplied to the first heater 5 to greatly improve the heating characteristic of the glow plug but also decrease the cost of manufacturing.

A powder 7 of heat resistant electric insulating material, for example magnesia is packed in the sheath 1 to embed the first and second heaters 5 and 6, and a guide rod 8 made of heat resistant electrical insulating material, ceramic for example, extends through the first and second heaters 5 and 6 to hold them at predetermined positions. Abutting ends 5a and 6a of the first and second heaters 5 and 6 are welded together to connect them in series while the other ends are electrically in contact with the closed end of the sheath 1 and rod 4, respectively.

The gap described above can be provided by a construction shown in FIG. 2. In the design of the first and second heaters 5 and 6 it is essential that the power of the first heater 5 should be controlled by the second heater 6 with a suitable time not to overheat the first heater 5. The ceramic guide rod 8 extending through the first and second heaters 5 and 6 is suitable to maintain an optimum gap between the first and second heaters 5 and 6 even when they are made of fine wires or soft materials. The use of the ceramic guide rod 8 facilitates insertion of the heaters 5 and 6 into the sheath 1. Moreover, even when the heater 5 or 6 may come into direct contact with the sheath 1, there is no fear of melting the sheath 1. When both heaters 5 and 6 have sufficient rigidity and can be interconnencted with a gap, therebetween it is not necessary to use the guide rod 8.

The size of the gap should be determined depending upon the outer diameter of the sheath 1, and wire diameters of both heaters 5 and 6, and where the winding pitches of both heaters is P, a preferred value of the gap is equal to 1.5 P to 12 P. Where the winding pitches of both heaters are not equal the first heater 5 is taken as a reference.

Figure 3:
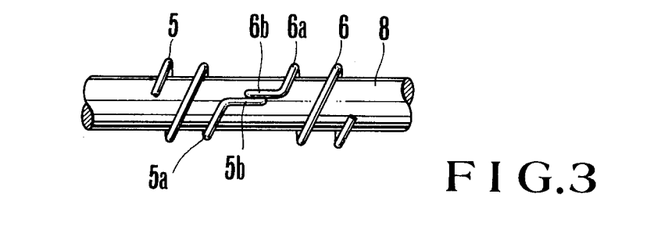
FIG. 3 is a fractional view showing a portion of FIG. 2.

Both heaters 5 and 6 are connected such that the gap provides a minimum necessary heat transfer across the gap. More particularly, in this embodiment, axially extending end portions 5b and 6b extending from the opposing ends 5a and 6a of the heaters 5 and 6 are abutted and electrically connected together by plasma arc welding. However, the axially extending portions 5b and 6b may be overlapped and welded together as shown in FIG. 3. The position of connection is not limited to the center of the gap but may be any position in the gap. The connector is not always necessary to extend axially but may be inclined with respect to the axis or may be curved or helical in the gap so long as the heat transfer between two heaters across the gap can be made to be small.

Figure 4:
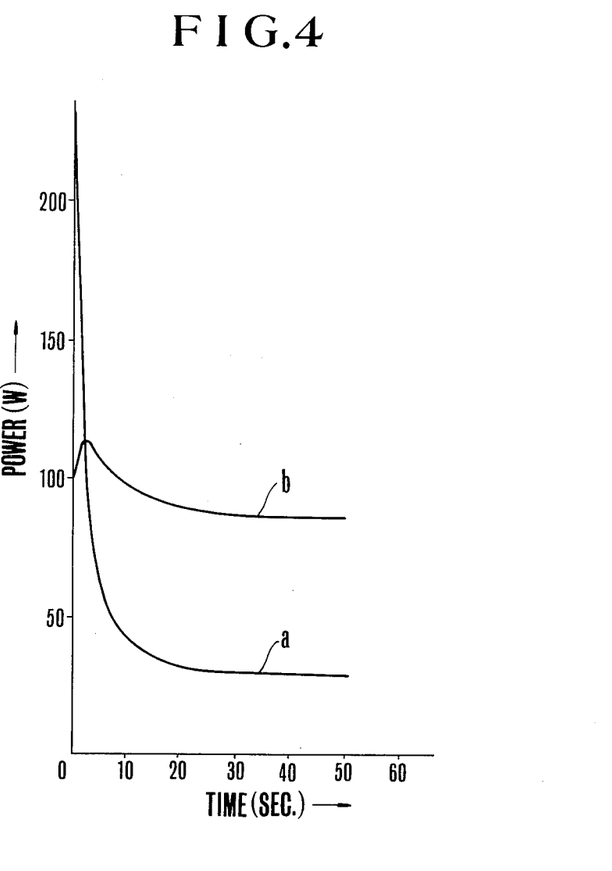
FIGS. 4 and 5 are graphs showing the characteristic curves useful to explain the operation of the glow plug of this invention.

With the glow plug having constructions described above, immediately after the energization, due to a small resistance of the second heater 6, a large power concentrates to the first heater 5 so that its power reaches 230 W as shown by curve a in FIG. 4, thus assuring rapid temperature rise. Due to the provision of a gap between the first and second heaters 5 and 6, there is a time lag in which the heat is transmitted from the first heater 5 to the second heater 6 to increase the resistance thereof. As a consequence it is possible to make long the interval in which a large power concentrates in the first heater 5 thus rapidly heating the same.

As shown by curve b in FIG. 4, about 100 W of power is applied to the second heater 6 so that it gradually generates heat and the resistance value of the second heater 6 increases gradually due to its own heat and the heat transmitted from the first heater 5. This increase in the resistance value decreases the current flowing through both heaters 5 and 6 thus limiting the quantity of the heat generated by the first heater 5 to prevent its overheating. At this time, the second heater 6 produces by itself the necessary quantity of heat. In this manner, the sheath 1 would be heated gradually to reach a temperature (usually 800° C.) necessary to start a diesel engine.

Figure 5:
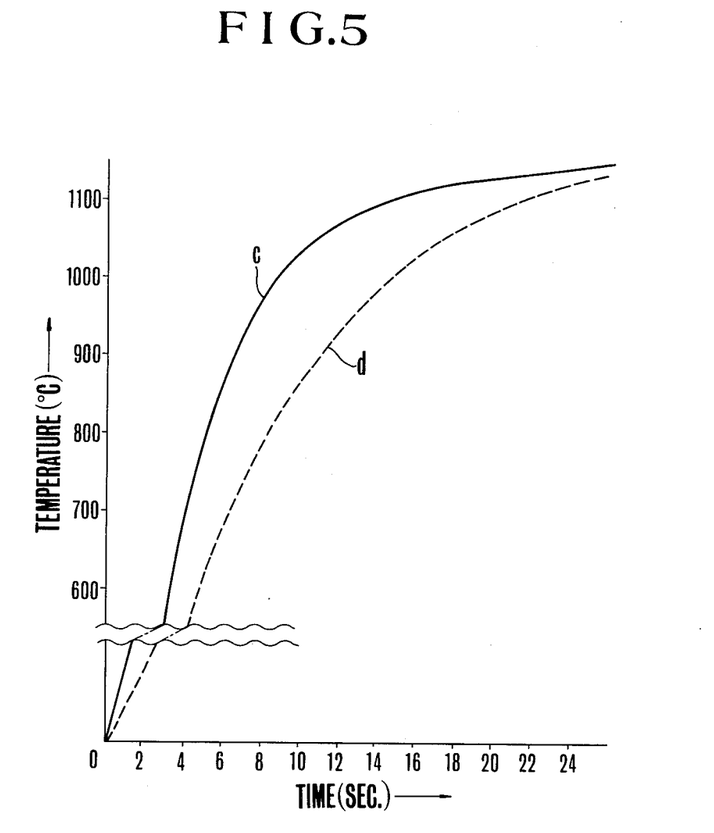

The heating characteristic of the glow plug embodying the invention is shown by curve c shown in FIG. 5 which shows a great improvement over that of the prior art shown by curve d in FIG. 5.

The length of the gap between the first and second heaters 5 and 6 is determined as follows.

Figure 6:
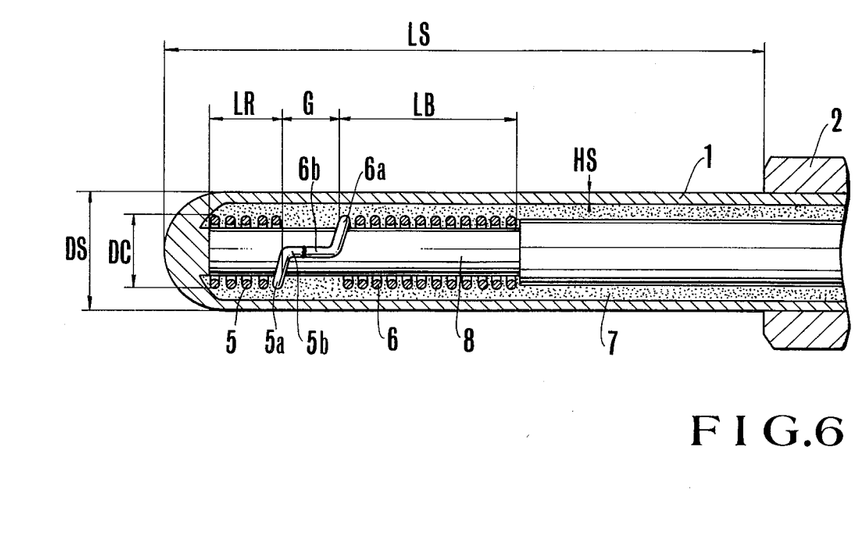
FIG. 6 is an enlarged longitudinal sectional view of the front portion of the glow plug useful to explain the experimental data.

As shown in FIG. 6, let us denote the outer diameter of the sheath 1 by DS, the wall thickness thereof by HS, the length of the sheath 1 protruding from the housing 2 by LS, the coil diameter of the first heater 5 by DC, the length thereof by LR, the length of the second heater 6 by LB and assume values of DS=5.0 mm, HS=0.8 mm, LS=25 mm, DC=2.3 mm, LR=3 mm, and LB=7 mm. Further, let us assume that the first heater 5 is made of a ferro-chromium wire having a diameter of 0.35 mm, a number of turns of 5, and a pitch of P=0.60 mm, and that the second heater 6 is made of a low carbon steel wire having a diameter of 0.38 mm, a number of turns of 12 and a pitch P of 0.58 mm. The relation between heating time and the gap G is shown in FIG. 7 while that between the temperature and the gap G is shown by FIG. 8.

Figure 7:
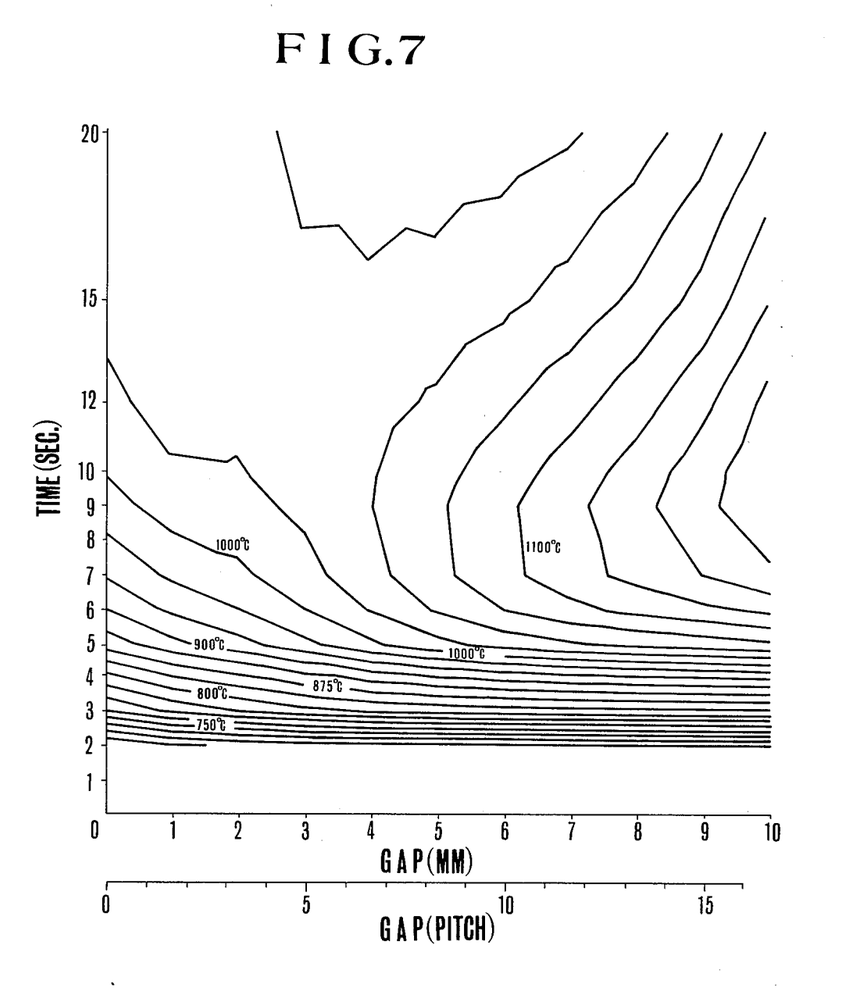
FIGS. 7 and 8 are graphs showing the relationship between the variation in a gap G and the temperature rise time and that between the variation in the gap G and the maximum temperature.
Figure 8:
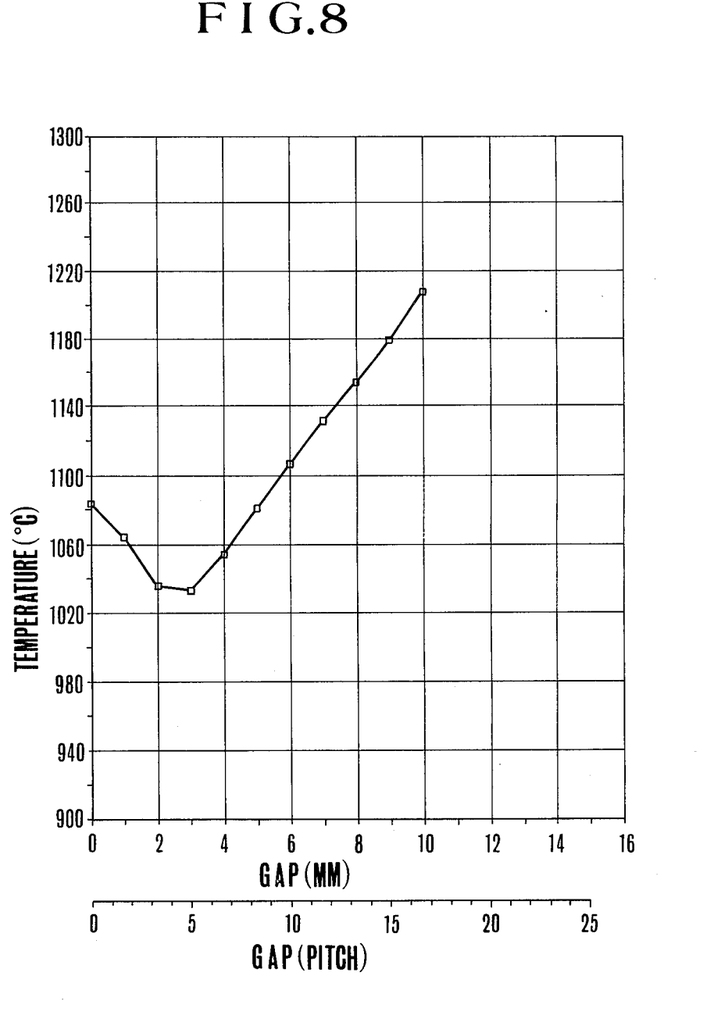

As can be noted from FIG. 7, in order to decrease the time necessary to reach the starting temperature (usually 800° C.) of the engine, the minimum length of the gap G between the two heaters 5 and 6 is 2 mm (larger than about 3.3 P). On the other hand, in order to prevent overheating of the first heater 5, its temperature should be less than 1150° C. Furthermore, as FIG. 8 shows, in order to limit the temperature of the first heater, the gap G should be less than 7 mm (less than about 12 P). Of course, these values are upper limits so that in the actual design these values are selected to be smaller than these values by taking into consideration the durability or life.

From the foregoing description it will be readily understood that, where above parameters are selected, the optimum value of the gap G amounts to 2-4 mm (3 P-7 P). Due to the modification of the design specification of the glow plug, even when the dimensions, pitches, etc. are changed, the result of experiments shows that so long as the gap G lies in a range of from 1.5 P to 12 P, satisfactory operation can be assured.

Figure 9:
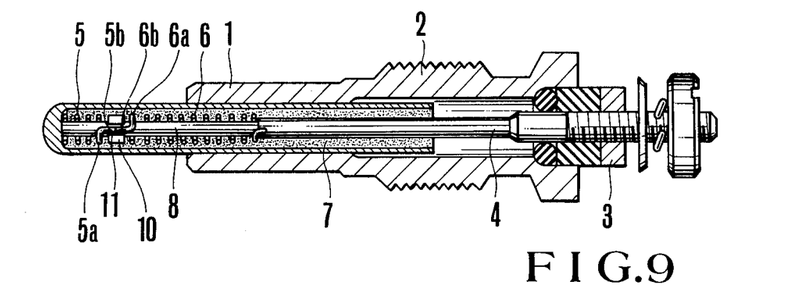
FIG. 9 is a longitudinal sectional view showing a modified embodiment of this invention.
Figure 10:
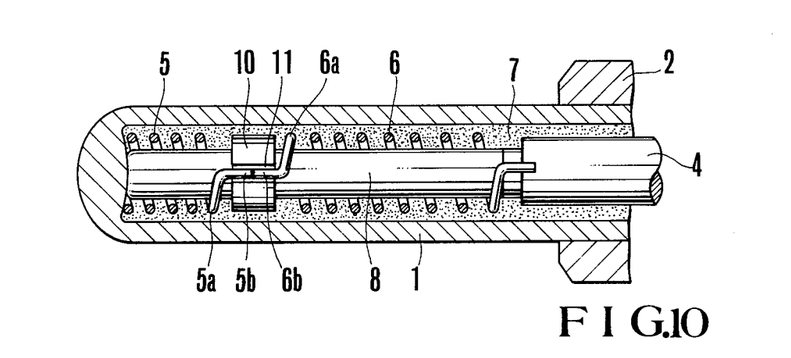
FIG. 10 is an enlarged view of the front portion of the modified embodiment shown in FIG. 9.
Figure 11:
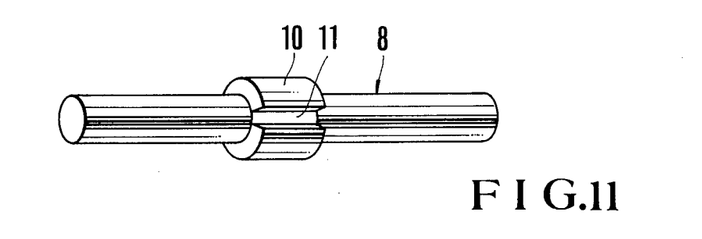
FIG. 11 is a perspective view showing a guide rod utilized in the modified embodiment shown in FIG. 9.

FIGS. 9 through 11 show a modified embodiment of this invention in which elements identical to those shown in FIGS. 1 and 2 are designated by the same reference numerals.

According to this embodiment, a portion of the guide rod 8 positioned in the gap formed between the first and second heaters 5 and 6 is enlarged as at a portion 10 for preventing heat transmission between the first and second heaters 5 and 6, and the enlarged portion 10 is provided with a straight axial groove 11 for receiving a straight connector formed by the axial extensions 5b and 6b of the first and second heaters 5 and 6. As above described, the groove 11 and the connector are not necessary to be axial.

When the enlarged portion 10 is provided for the guide rod 8, it is necessary to limit the heat transmitted between the two heaters 5 and 6 to a minimum necessary value so as to delay the current control effected by the second heater 6 which prolongs the time in which large power is concentrated to the first heater 5, thus accelerating its red heat. This also enables to accurately and stably adjust the time thereby greatly improving the heating characteristic. Moreover, since both heaters are electrically interconnected by the connector received in the groove 11 provided for the enlarged portion 10, the assembly of the glow plug can be facilitated. In addition, the enlarged portion 10 is effective to maintain a suitable gap between the two heaters. The gap between both heaters is suitably selected by considering the provision of the enlarged portion.

As above described according to the glow plug of this invention for use in a diesel engine comprises first and second heaters made of two materials having different resistance temperature coefficients, and a gap larger than the coil pitches of both heaters is provided therebetween for electrically interconnecting both heaters. Consequently, the following advantageous effects result.

(1) The temperature rise of the second heater is delayed so as to efficiently concentrate a large electric power to the first heater at the time of commencing energization so as to rapidly red heat the first heater. This great improves the temperature rise characteristic compared to the prior art construction whereby to provide a rapid heating type glow plug that can improve the starting characteristic of a diesel engine.

(2) At the time of starting the engine as it is possible to prevent overheating of the glow plug by the temperature control function of the second heater, the problem of breakage of the prior art glow plug due to melting can be eliminated.

(3) Moreover, as it is only necessary to provide a gap between the first and second heaters, not only the construction can be simplified but also manufacturing can be simplified and the overall action of the glow plug is made stable and reliable.

(4) Especially, since an electric insulating guide rod is used, preferably provided with an enlarged portion it is possible to obtain stable and optimum heating characteristic. Moreover, it is possible to simplify the assembling operation of the glow plug including welding of the two heaters.

What is claimed is:

1. In a glow plug for use in a diesel engine comprising a first helical heater, a second helical heater serial connected to said first helical heater, said second helical heater being made of material having a larger positive resistance temperature coefficient than the material constituting said first helical heater, and a sheath covering said first and second heaters and being electrically insulated along said first and second heaters, characterized in that said first and second heaters are separated axially by an axial gap G larger than winding pitches P of the first and second heaters and electrically connected by a straight connector in said gap so that said gap G is 1.5 P to 12 P, said first and second heaters being wound about a guide rod made of insulating material so as to maintain the axial layout of the first and second heaters with said straight connector and gap providing a thermal impedance to conductive heat flow from said first helical heater to said second helical heater, and said second helical heater being made of low carbon steel containing less than 0.25% by weight of carbon.

2. The glow plug according to claim 1 wherein said guide rod is provided with an enlarged portion being provided with said groove for receiving a connector interconnecting said first and second helical heaters.

3. The glow plug according to claim 2 wherein said groove extends in an axial direction of said sheath.

4. The glow plug according to claim 1 wherein said sheath is packed with a powder of heat resistant electric insulating material for embedding therein said first and second helical heaters.

5. The glow plug according to claim 1 wherein said first helical heater is made of an alloy selected from the group consisting of ferro-chromium and nickel-chromium.

6. The glow plug according to claim 1 wherein said gap G is 3 P to 7 P.

7. The glow plug according to claim 1 wherein said gap G is 2 to 4 mm.

* * * * *